United States Patent
Dean et al.

(10) Patent No.: US 8,005,276 B2
(45) Date of Patent: Aug. 23, 2011

(54) APPARATUS AND METHOD FOR REDUCING PARASITIC CAPACITIVE COUPLING AND NOISE IN FINGERPRINT SENSING CIRCUITS

(75) Inventors: Gregory Lewis Dean, Phoenix, AZ (US); Richard Alexander Erhart, Tempe, AZ (US); Jaswinder Jandu, Chandler, AZ (US); Erik Jonathon Thompson, Phoenix, AZ (US)

(73) Assignee: Validity Sensors, Inc., San Jose, CA (US)

( * ) Notice: Subject to any disclaimer, the term of this patent is extended or adjusted under 35 U.S.C. 154(b) by 739 days.

(21) Appl. No.: 12/098,370

(22) Filed: Apr. 4, 2008

(65) Prior Publication Data

US 2009/0252386 A1   Oct. 8, 2009

(51) Int. Cl.
   *G06K 9/28*   (2006.01)
(52) U.S. Cl. ......................................... 382/124
(58) Field of Classification Search .................. None
   See application file for complete search history.

(56) References Cited

U.S. PATENT DOCUMENTS

| | | |
|---|---|---|
| 4,353,056 A | 10/1982 | Tsikos |
| 4,525,859 A | 6/1985 | Bowles et al. |
| 4,550,221 A | 10/1985 | Mabusth |
| 5,076,566 A | 12/1991 | Kriegel |
| 5,109,427 A | 4/1992 | Yang |
| 5,305,017 A | 4/1994 | Gerpheide |
| 5,319,323 A | 6/1994 | Fong |
| 5,325,442 A | 6/1994 | Knapp |
| 5,420,936 A | 5/1995 | Fitzpatrick et al. |
| 5,422,807 A | 6/1995 | Mitra et al. |
| 5,543,591 A | 8/1996 | Gillespie et al. |
| 5,569,901 A | 10/1996 | Bridgelall et al. |
| 5,623,552 A | 4/1997 | Lane |
| 5,627,316 A | 5/1997 | De Winter et al. |
| 5,650,842 A | 7/1997 | Maase et al. |
| 5,717,777 A | 2/1998 | Wong et al. |
| 5,781,651 A | 7/1998 | Hsiao et al. |

(Continued)

FOREIGN PATENT DOCUMENTS

DE   2213813 A1   10/1973

(Continued)

OTHER PUBLICATIONS

Maltoni, "Handbook of Fingerprint Recognition", XP002355942 Springer, New York, USA, Jun. 2003 pp. 65-69.

(Continued)

*Primary Examiner* — Brian Werner
(74) *Attorney, Agent, or Firm* — Greenberg Traurig LLP; Cecily Anne O'Regan; William C. Cray

(57) ABSTRACT

A fingerprint sensing circuit for reducing noise and parasitic capacitive coupling is disclosed in one embodiment of the invention as including a plurality of transmitting elements to sequentially emit a probing signal. A digital ground is provided to ground digital components in the fingerprint sensing circuit. A quiet ground, separate from and quieter than the digital ground, is provided to ground transmitting elements that are not transmitting the probing signal. Similarly, control logic is provided to connect, to the quiet ground, transmitting elements that are not transmitting the probing signal, while disconnecting, from the quiet ground, transmitting elements that are emitting the probing signal. The quiet ground helps to reduce the adverse effects of parasitic capacitive coupling and noise on the inactive transmitting elements.

20 Claims, 6 Drawing Sheets

U.S. PATENT DOCUMENTS

| | | |
|---|---|---|
| 5,801,681 A | 9/1998 | Sayag |
| 5,818,956 A | 10/1998 | Tuli |
| 5,852,670 A | 12/1998 | Setlak et al. |
| 5,864,296 A | 1/1999 | Upton |
| 5,887,343 A | 3/1999 | Salatino et al. |
| 5,903,225 A | 5/1999 | Schmitt et al. |
| 5,920,384 A | 7/1999 | Borza |
| 5,920,640 A | 7/1999 | Salatino et al. |
| 5,940,526 A | 8/1999 | Setlak et al. |
| 5,999,637 A | 12/1999 | Toyoda et al. |
| 6,002,815 A | 12/1999 | Immega et al. |
| 6,016,355 A | 1/2000 | Dickinson et al. |
| 6,052,475 A | 4/2000 | Upton |
| 6,067,368 A | 5/2000 | Setlak et al. |
| 6,073,343 A | 6/2000 | Petrick et al. |
| 6,076,566 A | 6/2000 | Lowe |
| 6,088,585 A | 7/2000 | Schmitt et al. |
| 6,098,175 A | 8/2000 | Lee |
| 6,134,340 A | 10/2000 | Hsu et al. |
| 6,157,722 A | 12/2000 | Lerner et al. |
| 6,182,892 B1 | 2/2001 | Angelo et al. |
| 6,185,318 B1 | 2/2001 | Jain et al. |
| 6,259,108 B1 | 7/2001 | Antonelli et al. |
| 6,289,114 B1 | 9/2001 | Mainguet |
| 6,317,508 B1 | 11/2001 | Kramer et al. |
| 6,320,394 B1 | 11/2001 | Tartagni |
| 6,333,989 B1 | 12/2001 | Borza |
| 6,346,739 B1 | 2/2002 | Lepert et al. |
| 6,347,040 B1 | 2/2002 | Fries et al. |
| 6,362,633 B1 | 3/2002 | Tartagni |
| 6,392,636 B1 | 5/2002 | Ferrari et al. |
| 6,400,836 B2 | 6/2002 | Senior |
| 6,408,087 B1 | 6/2002 | Kramer |
| 6,473,072 B1 | 10/2002 | Comiskey et al. |
| 6,509,501 B2 | 1/2003 | Eicken et al. |
| 6,539,101 B1 | 3/2003 | Black |
| 6,580,816 B2 | 6/2003 | Kramer et al. |
| 6,643,389 B1 | 11/2003 | Raynal et al. |
| 6,672,174 B2 | 1/2004 | Deconde et al. |
| 6,738,050 B2 | 5/2004 | Comiskey et al. |
| 6,741,729 B2 | 5/2004 | Bjorn et al. |
| 6,757,002 B1 | 6/2004 | Oross et al. |
| 6,766,040 B1 | 7/2004 | Catalano et al. |
| 6,785,407 B1 | 8/2004 | Tschudi et al. |
| 6,838,905 B1 | 1/2005 | Doyle |
| 6,886,104 B1 | 4/2005 | McClurg et al. |
| 6,897,002 B2 | 5/2005 | Teraoka et al. |
| 6,898,299 B1 | 5/2005 | Brooks |
| 6,937,748 B1 | 8/2005 | Schneider et al. |
| 6,941,001 B1 | 9/2005 | Bolle et al. |
| 6,941,810 B2 | 9/2005 | Okada |
| 6,950,540 B2 | 9/2005 | Higuchi |
| 6,959,874 B2 | 11/2005 | Bardwell |
| 6,970,584 B2 | 11/2005 | O'Gorman et al. |
| 6,980,672 B2 | 12/2005 | Saito et al. |
| 6,983,882 B2 | 1/2006 | Cassone |
| 7,020,591 B1 | 3/2006 | Wei et al. |
| 7,030,860 B1 | 4/2006 | Hsu et al. |
| 7,042,535 B2 | 5/2006 | Katoh et al. |
| 7,043,644 B2 | 5/2006 | DeBruine |
| 7,046,230 B2 | 5/2006 | Zadesky et al. |
| 7,064,743 B2 | 6/2006 | Nishikawa |
| 7,099,496 B2 | 8/2006 | Benkley |
| 7,110,577 B1 | 9/2006 | Tschudi |
| 7,126,389 B1 | 10/2006 | McRae et al. |
| 7,129,926 B2 | 10/2006 | Mathiassen et al. |
| 7,136,514 B1 | 11/2006 | Wong |
| 7,146,024 B2 | 12/2006 | Benkley |
| 7,146,026 B2 | 12/2006 | Russon et al. |
| 7,146,029 B2 | 12/2006 | Manansala |
| 7,194,392 B2 | 3/2007 | Tuken et al. |
| 7,197,168 B2 | 3/2007 | Russo |
| 7,200,250 B2 | 4/2007 | Chou |
| 7,258,279 B2 | 8/2007 | Schneider et al. |
| 7,290,323 B2 | 11/2007 | Deconde et al. |
| 7,308,122 B2 | 12/2007 | McClurg et al. |
| 7,321,672 B2 | 1/2008 | Sasaki et al. |
| 7,460,697 B2 | 12/2008 | Erhart et al. |
| 7,463,756 B2 | 12/2008 | Benkley |
| 7,643,950 B1 | 1/2010 | Getzin et al. |
| 7,751,601 B2 | 7/2010 | Benkley |
| 2001/0036299 A1 | 11/2001 | Senior |
| 2001/0043728 A1 | 11/2001 | Kramer et al. |
| 2002/0025062 A1 | 2/2002 | Black |
| 2002/0067845 A1 | 6/2002 | Griffis |
| 2002/0089410 A1 | 7/2002 | Janiak et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0035570 A1 | 2/2003 | Benkley |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0123714 A1 | 7/2003 | O'Gorman et al. |
| 2003/0141959 A1 | 7/2003 | Keogh et al. |
| 2003/0147015 A1 | 8/2003 | Katoh et al. |
| 2003/0161510 A1 | 8/2003 | Fujii |
| 2003/0161512 A1 | 8/2003 | Mathiassen et al. |
| 2003/0169228 A1 | 9/2003 | Mathiassen et al. |
| 2003/0174871 A1 | 9/2003 | Yoshioka et al. |
| 2003/0186157 A1 | 10/2003 | Teraoka et al. |
| 2003/0224553 A1 | 12/2003 | Manansala |
| 2004/0012773 A1* | 1/2004 | Puttkammer .................... 356/71 |
| 2004/0050930 A1 | 3/2004 | Rowe |
| 2004/0076313 A1 | 4/2004 | Bronstein et al. |
| 2004/0081339 A1 | 4/2004 | Benkley |
| 2004/0096086 A1 | 5/2004 | Miyasaka |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0110103 A1 | 5/2005 | Setlak |
| 2005/0139656 A1 | 6/2005 | Arnouse |
| 2005/0162402 A1 | 7/2005 | Watanachote |
| 2005/0169503 A1 | 8/2005 | Howell et al. |
| 2005/0210271 A1 | 9/2005 | Chou et al. |
| 2005/0219200 A1 | 10/2005 | Weng |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0140461 A1 | 6/2006 | Kim et al. |
| 2006/0144953 A1 | 7/2006 | Takao |
| 2006/0187200 A1 | 8/2006 | Martin |
| 2006/0210082 A1 | 9/2006 | Devadas et al. |
| 2006/0214512 A1 | 9/2006 | Iwata |
| 2006/0239514 A1 | 10/2006 | Watanabe et al. |
| 2006/0249008 A1 | 11/2006 | Luther |
| 2006/0261174 A1 | 11/2006 | Zellner et al. |
| 2006/0271793 A1 | 11/2006 | Devadas et al. |
| 2007/0031011 A1* | 2/2007 | Erhart et al. .................. 382/124 |

| | | | | | | |
|---|---|---|---|---|---|---|
| 2007/0036400 | A1 | 2/2007 | Watanabe et al. | GB | 2331613 A | 5/1999 |
| 2007/0057763 | A1 | 3/2007 | Blattner et al. | JP | 04158434 A2 | 6/1992 |
| 2007/0067828 | A1 | 3/2007 | Bychkov | WO | WO 90/03620 A1 | 4/1990 |
| 2007/0076926 | A1 | 4/2007 | Schneider et al. | WO | WO 98/58342 A1 | 12/1998 |
| 2007/0076951 | A1 | 4/2007 | Tanaka et al. | WO | WO 99/28701 A1 | 6/1999 |
| 2007/0086634 | A1 | 4/2007 | Setlak et al. | WO | WO 99/43258 A1 | 9/1999 |
| 2007/0090312 | A1 | 4/2007 | Stallinga et al. | WO | WO 01/22349 A1 | 3/2001 |
| 2007/0138299 | A1 | 6/2007 | Mitra | WO | WO 01/94902 A2 | 12/2001 |
| 2007/0198141 | A1 | 8/2007 | Moore | WO | WO 01/94902 A3 | 12/2001 |
| 2007/0198435 | A1 | 8/2007 | Siegal et al. | WO | WO 02/47018 A2 | 6/2002 |
| 2007/0228154 | A1 | 10/2007 | Tran | WO | WO 02/47018 A3 | 6/2002 |
| 2007/0237366 | A1 | 10/2007 | Maletsky | WO | WO 02/061668 A1 | 8/2002 |
| 2007/0248249 | A1 | 10/2007 | Stoianov | WO | WO 02/077907 A1 | 10/2002 |
| 2008/0013805 | A1 | 1/2008 | Sengupta et al. | WO | WO 03/063054 A2 | 7/2003 |
| 2008/0019578 | A1 | 1/2008 | Saito et al. | WO | WO 03/075210 A2 | 9/2003 |
| 2008/0049987 | A1 | 2/2008 | Champagne et al. | WO | WO 2004/066194 A1 | 8/2004 |
| 2008/0063245 | A1 | 3/2008 | Benkley et al. | WO | WO 2004/066693 A1 | 8/2004 |
| 2008/0179112 | A1 | 7/2008 | Qin et al. | WO | WO 2005/104012 A1 | 11/2005 |
| 2008/0205714 | A1 | 8/2008 | Benkley et al. | WO | WO 2005/106774 A2 | 11/2005 |
| 2008/0219521 | A1 | 9/2008 | Benkley et al. | WO | WO 2005/106774 A3 | 11/2005 |
| 2008/0226132 | A1 | 9/2008 | Gardner | WO | WO 2006/041780 A1 | 4/2006 |
| 2008/0240523 | A1 | 10/2008 | Benkley et al. | WO | WO 2007/011607 A1 | 1/2007 |
| 2008/0267462 | A1 | 10/2008 | Nelson et al. | WO | WO 2008/033264 A2 | 3/2008 |
| 2008/0279373 | A1 | 11/2008 | Erhart et al. | WO | WO 2008/033264 A3 | 3/2008 |
| 2009/0153297 | A1 | 6/2009 | Gardner | WO | WO 2008/033265 A2 | 6/2008 |
| 2009/0154779 | A1 | 6/2009 | Satyan et al. | WO | WO 2008/033265 A3 | 6/2008 |
| 2009/0155456 | A1 | 6/2009 | Benkley et al. | WO | WO 2008/137287 A1 | 11/2008 |
| 2009/0252385 | A1 | 10/2009 | Dean et al. | WO | WO 2009/002599 A2 | 12/2008 |
| 2009/0252386 | A1 | 10/2009 | Dean et al. | WO | WO 2009/002599 A3 | 12/2008 |
| 2010/0026451 | A1 | 2/2010 | Erhart et al. | WO | WO 2009/079219 A1 | 6/2009 |
| 2010/0083000 | A1 | 4/2010 | Kesanupalli et al. | WO | WO 2009/079221 A2 | 6/2009 |
| 2010/0176823 | A1 | 7/2010 | Thompson et al. | WO | WO 2009/079262 A1 | 6/2009 |
| 2010/0176892 | A1 | 7/2010 | Thompson et al. | WO | WO 2010/034036 A1 | 3/2010 |
| 2010/0177940 | A1 | 7/2010 | Dean et al. | WO | WO 2010/036445 A1 | 4/2010 |
| 2010/0180136 | A1 | 7/2010 | Thompson et al. | | | |
| 2010/0189314 | A1 | 7/2010 | Benkley et al. | | | |
| 2010/0208953 | A1 | 8/2010 | Gardner et al. | | | |
| 2010/0272329 | A1 | 10/2010 | Benkley | | | |
| 2010/0284565 | A1 | 11/2010 | Benkley et al. | | | |
| 2011/0002461 | A1 | 1/2011 | Erhart et al. | | | |

FOREIGN PATENT DOCUMENTS

| | | | |
|---|---|---|---|
| EP | 1018697 | A2 | 7/2000 |
| EP | 1139301 | A2 | 10/2001 |
| EP | 1531419 | A2 | 5/2005 |
| EP | 1533759 | A1 | 5/2005 |
| EP | 1538548 | A2 | 6/2005 |
| EP | 1624399 | B1 | 2/2006 |
| EP | 1939788 | A1 | 7/2008 |

OTHER PUBLICATIONS

Vermasan, et al., "A500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adapative Flow Orientation-Based Feature Extraction Fingerprint Images," Pattern Recognition, vol. 28 No. 11, 1657-1672, Nov. 1995.

Ratha, et al. "A Real Time Matching System for Large Fingerprint Databases," IEEE, Aug. 1996.

* cited by examiner

APPARATUS AND METHOD FOR REDUCING PARASITIC CAPACITIVE COUPLING AND NOISE IN FINGERPRINT SENSING CIRCUITS

BACKGROUND

This invention relates to fingerprint sensing technology, and more particularly to apparatus and methods for reducing the effects of noise and parasitic capacitive coupling in fingerprint sensing circuits.

Fingerprint sensing technology is increasingly recognized as a reliable, non-intrusive way to verify individual identity. Fingerprints, like various other biometric characteristics, are based on unalterable personal characteristics and thus are believed to be more reliable when identifying individuals. The potential applications for fingerprints sensors are myriad. For example, electronic fingerprint sensors may be used to provide access control in stationary applications, such as security checkpoints. Electronic fingerprint sensors may also be used to provide access control in portable applications, such as portable computers, personal data assistants (PDAs), cell phones, gaming devices, navigation devices, information appliances, data storage devices, and the like. Accordingly, some applications, particularly portable applications, may require electronic fingerprint sensing systems that are compact, highly reliable, and inexpensive.

Various electronic fingerprint sensing methods, techniques, and devices have been proposed or are currently under development. For example, optical and capacitive fingerprint sensing devices are currently on the market or under development. Like a digital camera, optical technology utilizes visible light to capture a digital image. In particular, optical technology may use a light source to illuminate an individual's finger while a charge-coupled device (CCD) captures an analog image. This analog image may then be converted to a digital image.

There are generally two types of capacitive fingerprint sensing technologies: passive and active. Both types of capacitive technologies utilize the same principles of capacitance to generate fingerprint images. Passive capacitive technology typically utilizes an array of plates to apply an electrical current to the finger. The voltage discharge is then measured through the finger. Fingerprint ridges will typically have a substantially greater discharge potential than valleys, which may have little or no discharge.

Active capacitive technology is similar to passive technology, but may require initial excitation of the epidermal skin layer of the finger by applying a voltage. Active capacitive sensors, however, may be adversely affected by dry or worn minutia, which may fail to drive the sensor's output amplifier. By contrast, passive sensors are typically capable of producing images regardless of contact resistance and require significantly less power.

Although each of the fingerprint sensing technologies described above may generate satisfactory fingerprint images, each may be adversely affected by noise, interference, and other effects. For example, capacitive sensors may be particularly susceptible to noise and parasitic capacitive coupling, which may degrade the quality of the acquired fingerprint image. Accordingly, it would be an advance in the art to reduce the effects of noise, parasitic capacitive coupling, and other effects in capacitive-type fingerprint sensing circuits.

BRIEF DESCRIPTION OF THE DRAWINGS

In order that the advantages of the invention will be readily understood, a more particular description of the invention briefly described above will be rendered by reference to specific examples illustrated in the appended drawings. Understanding that these drawings depict only typical examples of the invention and are not therefore to be considered limiting of its scope, the invention will be described and explained with additional specificity and detail through use of the accompanying drawings, in which.

DETAILED DESCRIPTION

Figure 1:
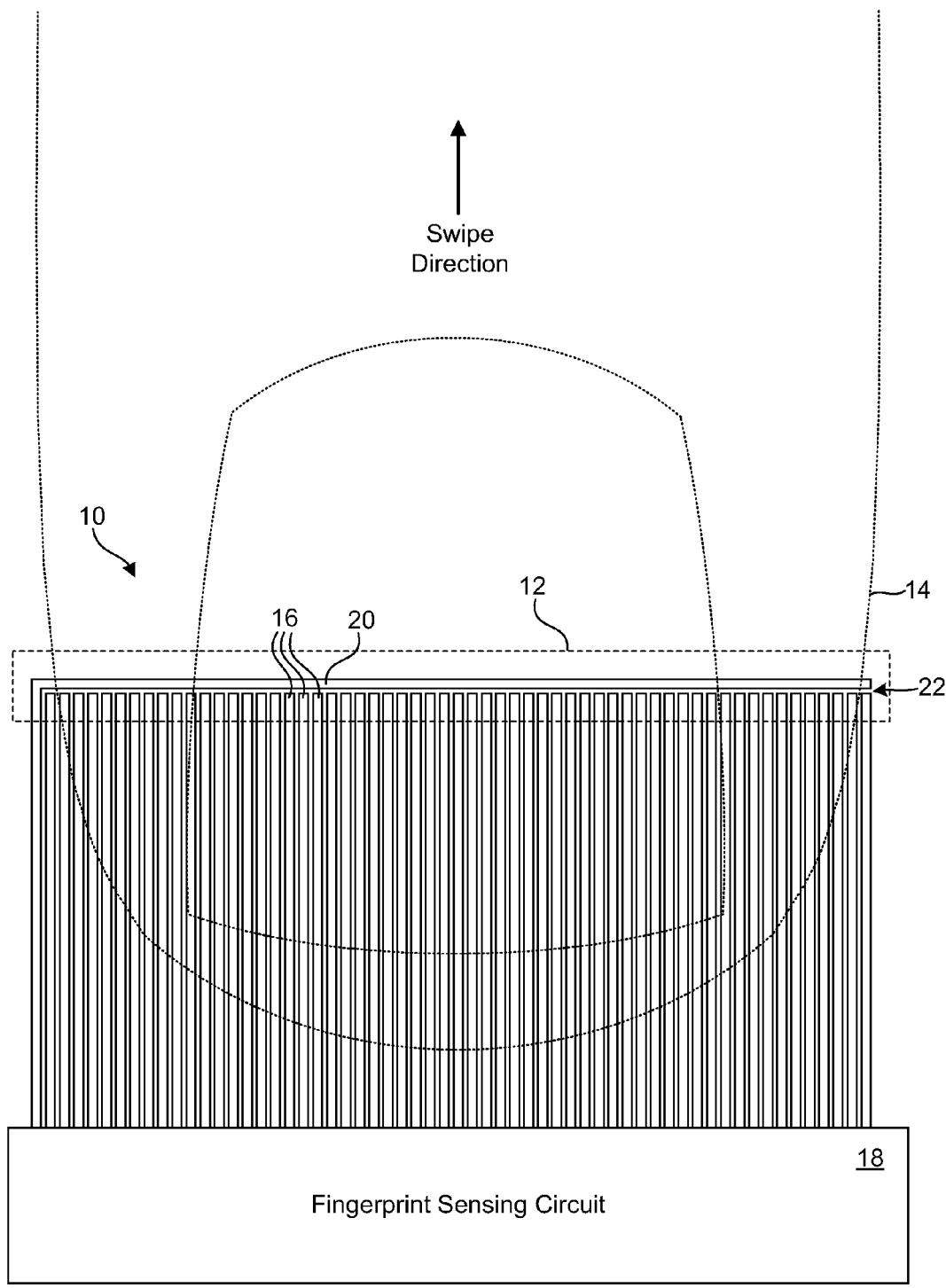
FIG. 1 is a high-level block diagram of one embodiment of a fingerprint sensing area containing an array of fingerprint sensing elements and interfacing with a fingerprint sensing circuit.

The invention has been developed in response to the present state of the art, and in particular, in response to the problems and needs in the art that have not yet been fully solved by currently available fingerprint sensors. Accordingly, the invention has been developed to provide novel apparatus and methods for reducing parasitic capacitive coupling and noise in fingerprint sensing circuits. The features and advantages of the invention will become more fully apparent from the following description and appended claims and their equivalents, and also any subsequent claims or amendments presented, or may be learned by practice of the invention as set forth hereinafter.

Consistent with the foregoing, a fingerprint sensing circuit having reduced parasitic capacitive coupling and noise is disclosed in one embodiment of the invention as including multiple transmitting elements, such as a linear array of transmitting elements, to sequentially emit a probing signal. A digital ground is provided to ground digital components in the fingerprint sensing circuit. A quiet ground, separate from and containing less noise than the digital ground, is provided to ground inactive transmitting elements (i.e., transmitting elements that are not currently emitting the probing signal). Control logic is provided to connect the inactive transmitting elements to the quiet ground, while disconnecting active transmitting elements (i.e., transmitting elements that are currently emitting the probing signal) from the quiet ground. The quiet ground is provided to reduce parasitic capacitive coupling and noise on inactive transmitting elements.

In selected embodiments, the fingerprint sensing circuit further includes multiple switches to selectively connect and disconnect each transmitting element from the quiet ground. The control logic may be used to control the operation of the switches. In certain embodiments, the control logic is further configured to connect, to the digital ground, transmitting elements that are adjacent to the active transmitting element. This may be performed to keep noise and other unwanted signals from adversely being transmitted onto the quiet ground.

In another embodiment in accordance with the invention, a method for reducing parasitic capacitive coupling and noise in fingerprint sensing circuits includes providing multiple transmitting elements to sequentially emit a probing signal, a digital ground to ground digital components in the fingerprint sensing circuit, and a quiet ground, separate from the digital ground, to ground inactive transmitting elements. The method further includes connecting inactive transmitting elements to the quiet ground and disconnecting active transmitting elements from the quiet ground. In this way, the quiet ground may be used to reduce parasitic capacitive coupling and noise on inactive transmitting elements.

In yet another embodiment in accordance with the invention, a fingerprint sensing circuit for reducing the adverse effects of parasitic capacitive coupling and noise includes multiple receiving elements to sequentially sense a probing signal. A digital ground is provided to ground digital components in the fingerprint sensing circuit. A quiet ground, separate from the digital ground, is provided to ground inactive receiving elements (i.e., receiving elements that are not currently sensing the probing signal). Control logic is provided to connect inactive receiving elements to the quiet ground while disconnecting active receiving elements (i.e., receiving elements that are currently sensing the probing signal) from the quiet ground. In this way, the quiet ground may reduce the adverse effects of parasitic capacitive coupling and noise on receiving elements configured to sense or detect a probing signal.

It will be readily understood that the components of the present invention, as generally described and illustrated in the Figures herein, may be arranged and designed in a wide variety of different configurations. Thus, the following more detailed description of the embodiments of the systems and methods of the present invention, as represented in the Figures, is not intended to limit the scope of the invention, as claimed, but is merely representative of selected embodiments of the invention.

Some of the functional units or method steps described in this specification may be embodied or implemented as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose of the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Referring to FIG. 1, in selected embodiments, a fingerprint sensor 10 useable with an apparatus and method in accordance with the invention may include a fingerprint sensing area 12 to provide a surface onto which a user can swipe a fingerprint. A dotted outline of a finger 14 is shown superimposed over the fingerprint sensing area 12 to provide a general idea of the size and scale of one embodiment of a fingerprint sensing area 12. The size and shape of the fingerprint sensing area 12 may vary, as needed, to accommodate different applications.

In certain embodiments, the fingerprint sensing area 12 may include an array of transmitting elements 16, such as a linear array of transmitting elements 16, to assist in scanning lines of "pixels" as a fingerprint is swiped across the fingerprint sensing area 12. In this embodiment, the transmitting elements 16 are shown as a linear array of conductive traces 16 connected to a fingerprint sensing circuit 18. The transmitting elements 16 are not drawn to scale and may include several hundred transmitting elements 16 arranged across the width of a fingerprint, one transmitting element 16 per pixel. A fingerprint image may be generated by scanning successive lines of pixels as a finger is swiped over the array. These lines may then be assembled to generate a fingerprint image, similar to the way a fax image is generated using line-by-line scanning.

In certain embodiments, the transmitting elements 16 are configured to sequentially emit, or burst, a probing signal, one after the other. As will be explained in more detail hereafter, the probing signal may include a burst of probing pulses, such as a burst of square waves. This probing signal may be sensed on the receiving end by a receiving element 20. Like the transmitting elements 16, the receiving element 20 is shown as a conductive trace 20 connected to the fingerprint sensing circuit 18. Although shown as a single receiving element 20, in other embodiments, pairs of receiving elements 20 may be used to differentially cancel out noise.

At the receiving element 20, a response signal may be generated in response to the probing signal. The magnitude of the response signal may depend on factors such as whether a finger is present over the fingerprint sensing area 12 and, more particularly, whether a ridge or valley of a fingerprint is immediately over the gap 22 between a transmitting element 16 and the receiving element 20. The magnitude of the signal generated at the receiving element 20 may be directly related to the RF impedance of a finger ridge or valley placed over the gap 22 between the corresponding transmitting element 16 and receiving element 20.

By using a single receiving element 20 (or a small number of receiving elements 20) and a comparatively larger number of transmitting elements 16, a receiver that is coupled to the receiving element 20 may be designed to be very high quality and with a much better dynamic range than would be possible using an array of multiple receiving elements. This design differs from many conventional fingerprint sensors, which may employ a single large transmitting element with a large array of receiving elements and receivers. Nevertheless, the apparatus and methods described herein are not limited to the illustrated transmitter and receiver design. Indeed, the apparatus and methods disclosed herein may be used with fingerprint sensors using a small number of transmitting elements and a relatively large number of receiving elements, a large number of transmitting elements and a relatively small number of receiving element, or a roughly equal number of transmitting and receiving elements.

As shown in FIG. 1, the fingerprint sensing area 12 (including the transmitting and receiving elements 16, 20) may be physically decoupled from the fingerprint sensing circuit 18. Positioning the sensing elements 16, 20 off the silicon die may improve the reliability of the fingerprint sensor 10 by reducing the sensor's susceptibility to electrostatic discharge, wear, and breakage. This may also allow the cost of the sensor 10 to be reduced over time by following a traditional die-shrink roadmap. This configuration provides a distinct advantage over direct contact sensors (sensors that are integrated onto the silicon die) which cannot be shrunk to less than the width of an industry standard fingerprint. Nevertheless, the apparatus and methods disclosed herein are applicable to fingerprint sensors with sensing elements that are located either on or off the silicon die.

Figure 2:
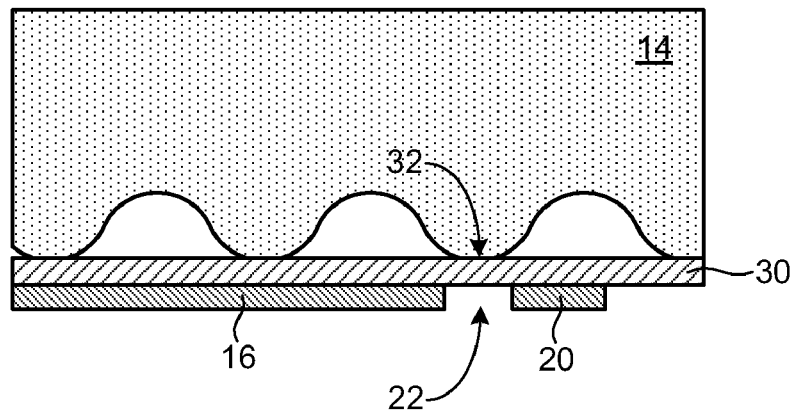
FIG. 2 is a partial cutaway profile view of a fingerprint sensing area showing the interaction between a finger and fingerprint sensing elements in a capacitive-type fingerprint sensor, with a fingerprint ridge lying substantially over the sensor gap.
Figure 3:
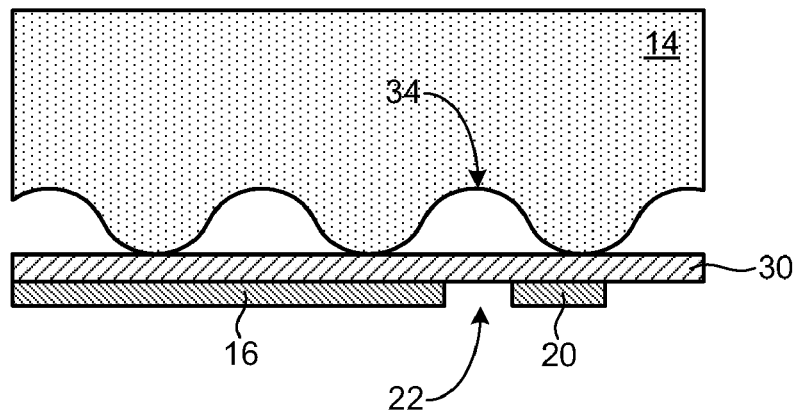
FIG. 3 is a partial cutaway profile view of a fingerprint sensing area showing the interaction between a finger and fingerprint sensing elements in a capacitive-type fingerprint sensor, with a fingerprint valley lying substantially over the sensor gap.

Referring generally to FIGS. 2 and 3, in selected embodiments, the transmitting and receiving elements 16, 20 discussed above may be adhered to a non-conductive substrate 30. For example, the substrate 30 may be constructed of a flexible polyimide material marketed under the trade name Kapton® and with a thickness of between about 25 and 100 µm. The Kapton® polymer may allow the fingerprint sensor 10 to be applied to products such as touchpads and molded plastics having a variety of shapes and contours while providing exceptional durability and reliability.

In selected embodiments, a user's finger may be swiped across the side of the substrate 30 opposite the transmitting and receiving elements 16, 20. Thus, the substrate 30 may electrically and mechanically isolates a user's finger from the transmitting element 16 and receiving element 20, thereby providing some degree of protection from electrostatic discharge (ESD) and mechanical abrasion.

The capacitive coupling between the transmitting element 16 and the receiving element 20 may change depending on whether a fingerprint ridge or valley is immediately over the gap 22. This is because the dielectric constant of a finger is typically ten to twenty times greater than the dielectric constant of air. The dielectric constant of the ridges of a finger may vary significantly from finger to finger and person to person, explaining the significant range of dielectric constants. Because a fingerprint ridge has a dielectric constant that differs significantly from that of air, the capacitive coupling between the transmitting element 16 and receiving element 20 may vary significantly depending on whether a ridge or valley is present over the sensor gap 22.

For example, referring to FIG. 2, when a fingerprint ridge 32 is over the gap 22, the capacitive coupling between the transmitting element 16 and receiving element 20 may be increased such that the probing signal emitted by the transmitting element 16 is detected at the receiving element 20 as a stronger response signal. It follows that a stronger response signal at the receiving element 20 indicates the presence of a ridge 32 over the gap 22. On the other hand, as shown in FIG. 3, the capacitive coupling between the transmitting element 16 and receiving element 20 may decrease when a valley is present over the gap 22. Thus, a weaker response signal at the receiving element 20 may indicate that a valley 34 is over the gap 22. By measuring the magnitude of the response signal at the receiving element 20, ridges and valleys may be detected as a user swipes his or her finger across the sensing area 12, allowing a fingerprint image to be generated.

Figure 4:
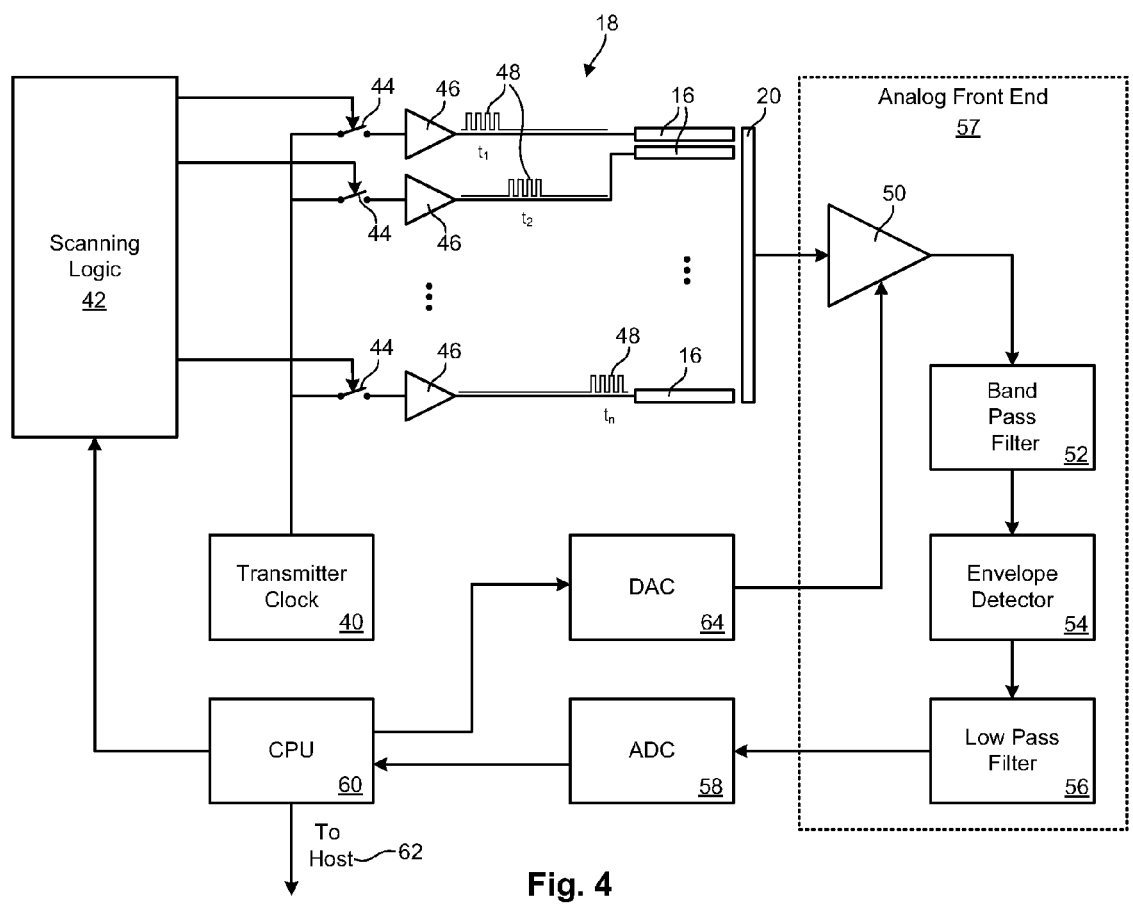
FIG. 4 is a high-level block diagram of one embodiment of a fingerprint sensing circuit for use with the present invention.

Referring to FIG. 4, in certain embodiments, a fingerprint sensing circuit 18 useable with an apparatus and method in accordance with the invention may include a transmitter clock 40 configured to generate an oscillating signal, such as an oscillating square-wave signal. Scanning logic 42 may be used to sequentially route the oscillating signal to buffer amplifiers 46, one after the other, using switches 44. The buffer amplifiers 46 may amplify the oscillating signal to generate the probing signal. As shown, the buffer amplifiers 46 may sequentially burst the probing signal 48 to each of the transmitting elements 16, one after the other. A response signal, generated in response to the probing signal 48, may be sensed at the receiving element 20 and may be routed to a variable-gain amplifier 50 to amplify the response signal. The amplified response signal may then be passed to a band pass filter 52 centered at the frequency of the transmitter clock 40.

The output from the band pass filter 52 may then be supplied to an envelope detector 54, which may detect the envelope of the response signal. This envelope may provide a baseband signal, the amplitude of which may vary depending on whether a ridge or valley is over the sensor gap 22. The baseband signal may be passed to a low pass filter 56 to remove unwanted higher frequencies. The variable-gain amplifier 50, band pass filter 52, envelope detector 54, low pass filter 56, as well as other analog components may be collectively referred to as an analog front end 57.

The output from the low pass filter 56 may be passed to an analog-to-digital converter (ADC) 58, which may convert the analog output to a digital value. The ADC 58 may have, for example, a resolution of 8 to 12 bits and may be capable of resolving the output of the low pass filter 56 to 256 to 4096 values. The magnitude of the digital value may be proportional to the signal strength measured at the receiving element 20. Likewise, as explained above, the signal strength may be related to the capacitive coupling between the transmitting element 16 and receiving element 20, which may depend on the RF impedance of the feature over the sensor gap 22.

The resulting digital value may be passed to a CPU 60 or other digital components, which may eventually pass digital fingerprint data to a host system 62. The host system 62, in selected embodiments, may process the fingerprint data using various matching algorithms in order to authenticate a user's fingerprint.

In addition to processing the digital data, the CPU 60 may control the gain of the variable-gain amplifier 50 using a digital-to-analog converter (DAC) 64. The gain may be adjusted to provide a desired output power or amplitude in the presence of variable sensing conditions. For example, in selected embodiments, the gain of the variable-gain amplifier 50 may be adjusted to compensate for variations in the impedance of different fingers. In selected embodiments, the CPU 60 may also control the operation of the scanning logic 42.

Figure 5:
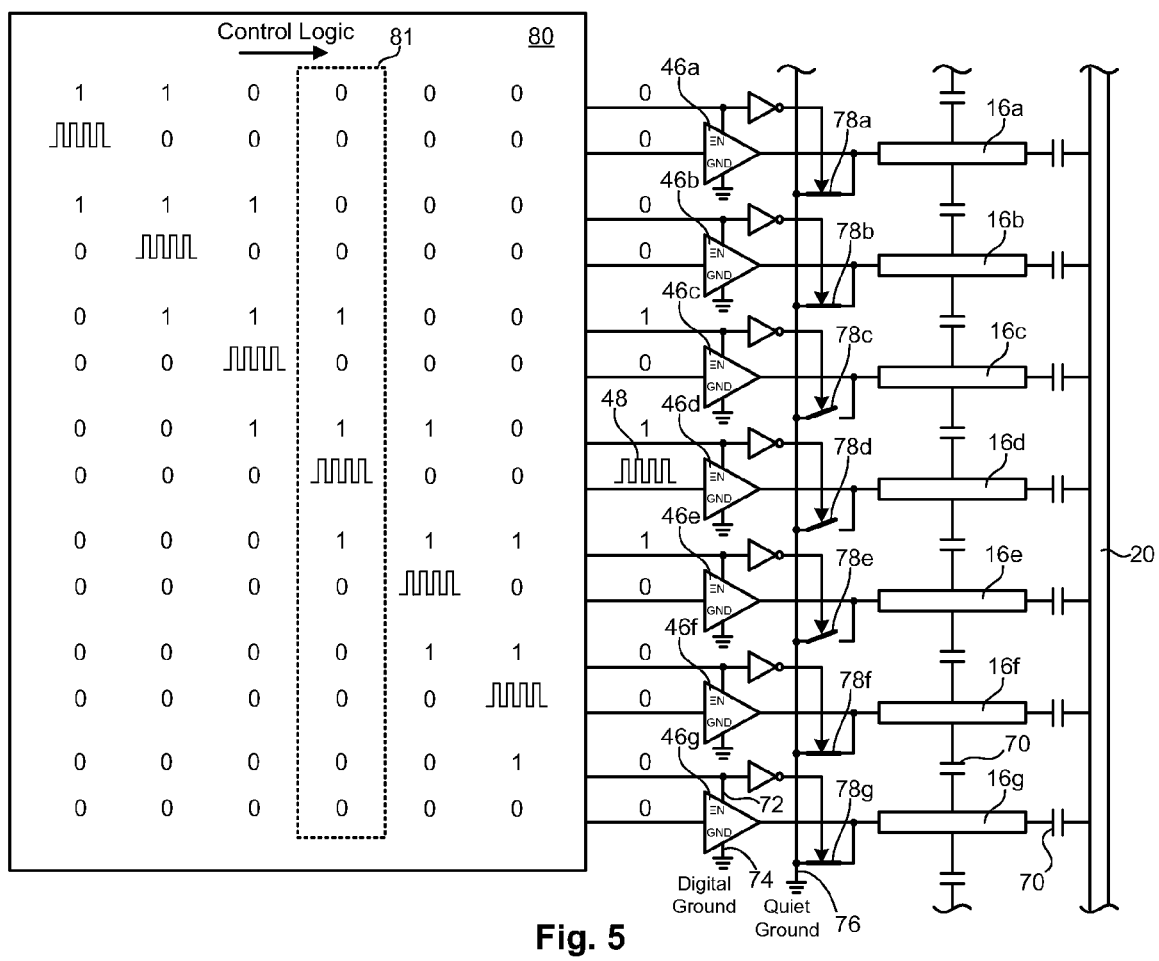
FIG. 5 is a high-level block diagram showing one embodiment of an apparatus to connect and disconnect transmitting elements to and from a quiet ground in accordance with the invention.

Referring to FIG. 5, as described herein, various fingerprint-sensing technologies may be adversely affected by noise, interference, and other effects. For example, capacitive sensors may be particularly susceptible to noise and parasitic capacitive coupling, which may degrade the quality of the acquired fingerprint image. Accordingly, apparatus and methods are needed to reduce the effects of noise and parasitic capacitive coupling in fingerprint sensing circuits.

As shown in FIG. 5, parasitic capacitance may be present between each of the transmitting elements 16, as well as between the transmitting elements 16 and the receiving element 20. The parasitic capacitance between the transmitting and receiving elements 16, 20 is represented by capacitor symbols 70. The parasitic capacitance may be exacerbated by the close spacing of the transmitting elements 16 and the receiving element 20.

For example, the width and spacing of the transmitting elements 16 may determine the resolution of the acquired fingerprint image. To achieve an industry standard resolution of 500 dots per inch, for example, the width of each transmitting element 16 may be approximately 25 microns. Similarly, the gap between adjacent transmitting elements 16 may be approximately 25 microns. The sensor gap 22 between the transmitting elements 16 and the receiving element 20 may be approximately 25 microns. This results in a center-to-center spacing of adjacent transmitting elements 16 of approximately 50 microns. Nevertheless, these dimensions are provided only by way of example and are not intended to be limiting.

As previously mentioned, the transmitting elements 16 may be coupled to output buffer amplifiers 46 to amplify the probing signal and accommodate a change in electrical impedance. More particularly, the output buffer amplifiers 46 may sequentially burst a probing signal 48 to each of the transmitting elements 16, one after the other, as described in FIG. 4. Input lines 72 may be enabled with a high logic value when the output buffer amplifiers 46 are transmitting the probing signal 48. When the output buffer amplifiers 46 are not transmitting the probing signal 48, the output buffer amplifiers 46 may be configured to drive the associated transmitting element 16 to digital ground 74.

In addition to providing a ground for the transmitting elements 16, the digital ground 74 may provide a ground for various digital components in the fingerprint sensing circuit 18, such as the CPU 60 and other digital components such as the ADC 58, DAC 64, oscillator 40, and the like. This may allow any parasitic capacitive fields between the active transmitting element 16 and the inactive transmitting elements 16 to be shorted to the digital ground 74.

Although the digital ground 74 may reduce much of the undesired parasitic capacitive coupling between the transmitting and receiving elements 16, 20, the digital ground 74 may have the undesired effect of transmitting noise onto the transmitting elements 16. This noise may be the result of switching noise generated by digital components such as the CPU 60, memory, or other digital components when they change state. This noise may be capacitively coupled to other transmitting elements 16 or the receiving element 20, thereby degrading the acquired fingerprint image. Thus, apparatus and methods are needed to reduce the noise that is transmitted from the digital ground 74 onto the transmitting and receiving elements 16, 20.

In selected embodiments in accordance with the invention, a quiet ground 76 separate from and isolated from the digital ground 74 may be used to reduce noise on the transmitting and receiving elements 16, 20. In certain embodiments, the quiet ground 76 and digital ground 74 may not be totally separated, but may, for example, connect at a single point. The single point may keep the ground potentials of the ground planes substantially the same, but may keep the transfer of digital noise to a minimum. Switches 78 may be used to selectively connect and disconnect the transmitting elements 16 to and from the quiet ground 76. In certain embodiments, control logic 80 may be used to open and close the switches 78 as the probing signal is sequentially transmitted to each transmitting element 16.

The dotted line 81 in the control logic 80 is used to show the current column of logic values which is output to the buffer amplifiers 46a-g. These logic values will change as the fingerprint sensing circuit 18 sequentially moves from one transmitting element 16a-g to the next. In certain embodiments, the control logic 80 may output the illustrated logic values, moving left to right, column-by-column, to the buffer amplifiers 46a-g.

In certain embodiments in accordance with the invention, the control logic 80 may be configured to connect inactive transmitting elements 16c, 16e that are adjacent to the active transmitting element 16d to the digital ground 74, while connecting all other inactive transmitting elements 16a, 16b, 16f, 16g to the quiet ground 76. This technique may reduce the amount of noise that would otherwise be parasitically coupled from the active transmitting element 16d to the adjacent transmitting elements 16c, 16e and ultimately onto the quiet ground 76. In other words, this technique may help ensure that the quiet ground 76 is maintained as quiet as possible.

For example, as illustrated in FIG. 5, when an amplifier buffer 46d is transmitting the probing signal to the active transmitting element 16d, the adjacent inactive transmitting element 16c, 16e may be coupled to the digital ground 74 and decoupled from the quiet ground 76 (as indicated by the "1" on the enable line of the buffer 46d and the open switches 78c, 78e). The remaining inactive transmitting elements 16a, 16b, 16f, 16g may be coupled to the quiet ground 76 (as indicated by the "0" on the enable lines and the closed switches 78a, 78b, 78f, 78g). In this way, any signal that is parasitically coupled from the active transmitting element 16d to the adjacent transmitting elements 16c, 16e may be conducted to digital ground 74 rather than to quiet ground 76. This ensures that the quiet ground 76 is maintained as quiet as possible.

Apparatus and methods in accordance with the invention are not limited to the illustrated embodiment. For example, in other embodiments, transmitting elements 16c, 16e that are adjacent to the active transmitting element 16d may be coupled to the quiet ground 76 just like other transmitting elements 16a, 16b, 16f, 16g. In this embodiment, only the active transmitting element 16d is decoupled from the quiet ground 76. Whether adjacent transmitting elements 16c, 16e are or are not coupled to the quiet ground 76 may depend on the amount of parasitic capacitance between the active transmitting element 16d and the adjacent transmitting elements 16c, 16d.

By contrast, in other embodiments, more than two adjacent transmitting elements may be coupled to the digital ground 74 and decoupled from the quiet ground 76. For example, two transmitting elements 16b, 16c, 16e, 16f on either side of the active transmitting element 16d may be coupled to the digital ground 74 and decoupled from the quiet ground 76 to ensure that the quiet ground 76 is maintained as quiet as possible. Similarly, any number of transmitting elements 16 on either side of the active transmitting element 16d may be coupled to the digital ground 74 and decoupled from the quiet ground 76.

Figure 6:
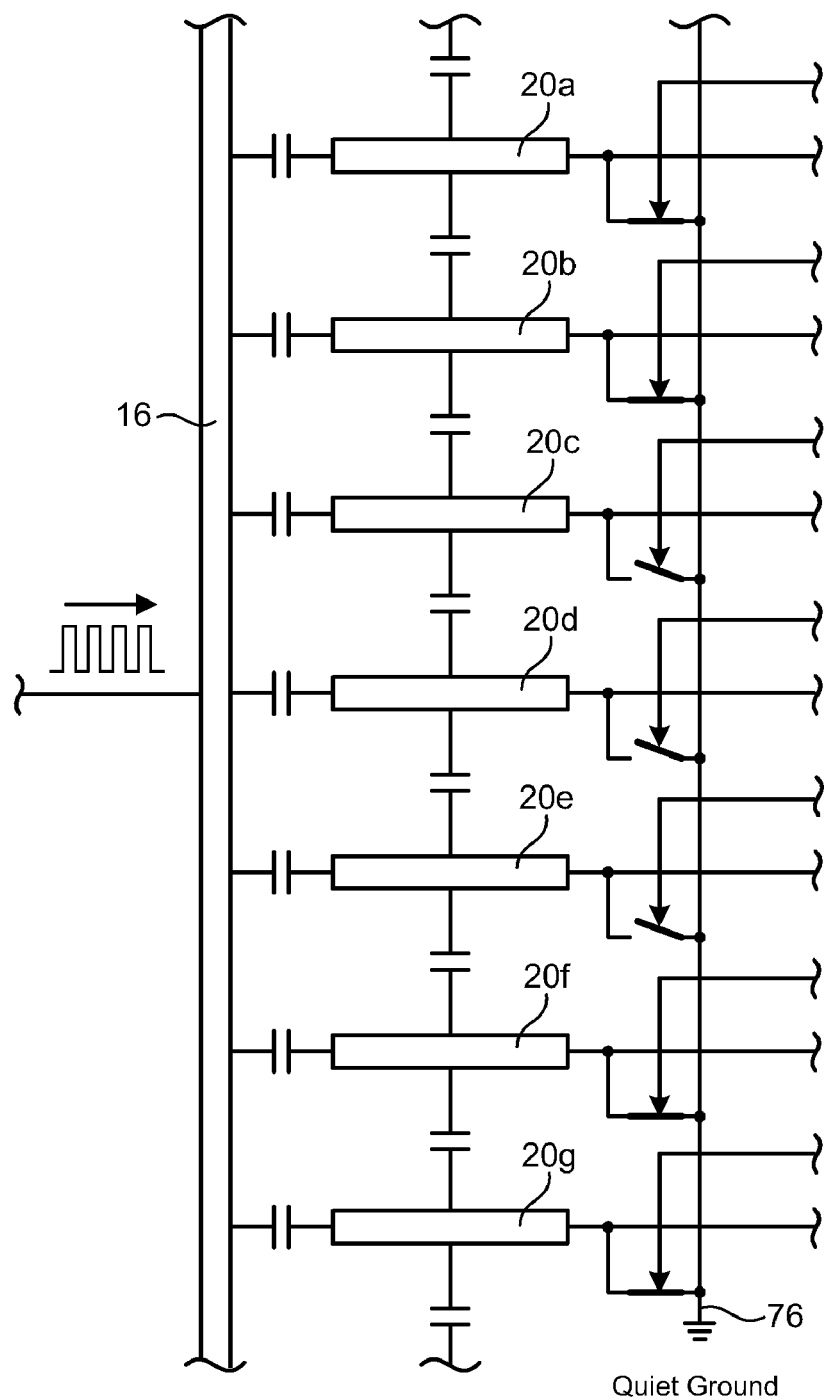
FIG. 6 is a high-level block diagram showing an embodiment of an apparatus to connect and disconnect receiving elements to and from a quiet ground in accordance with the invention.
Figure 7:
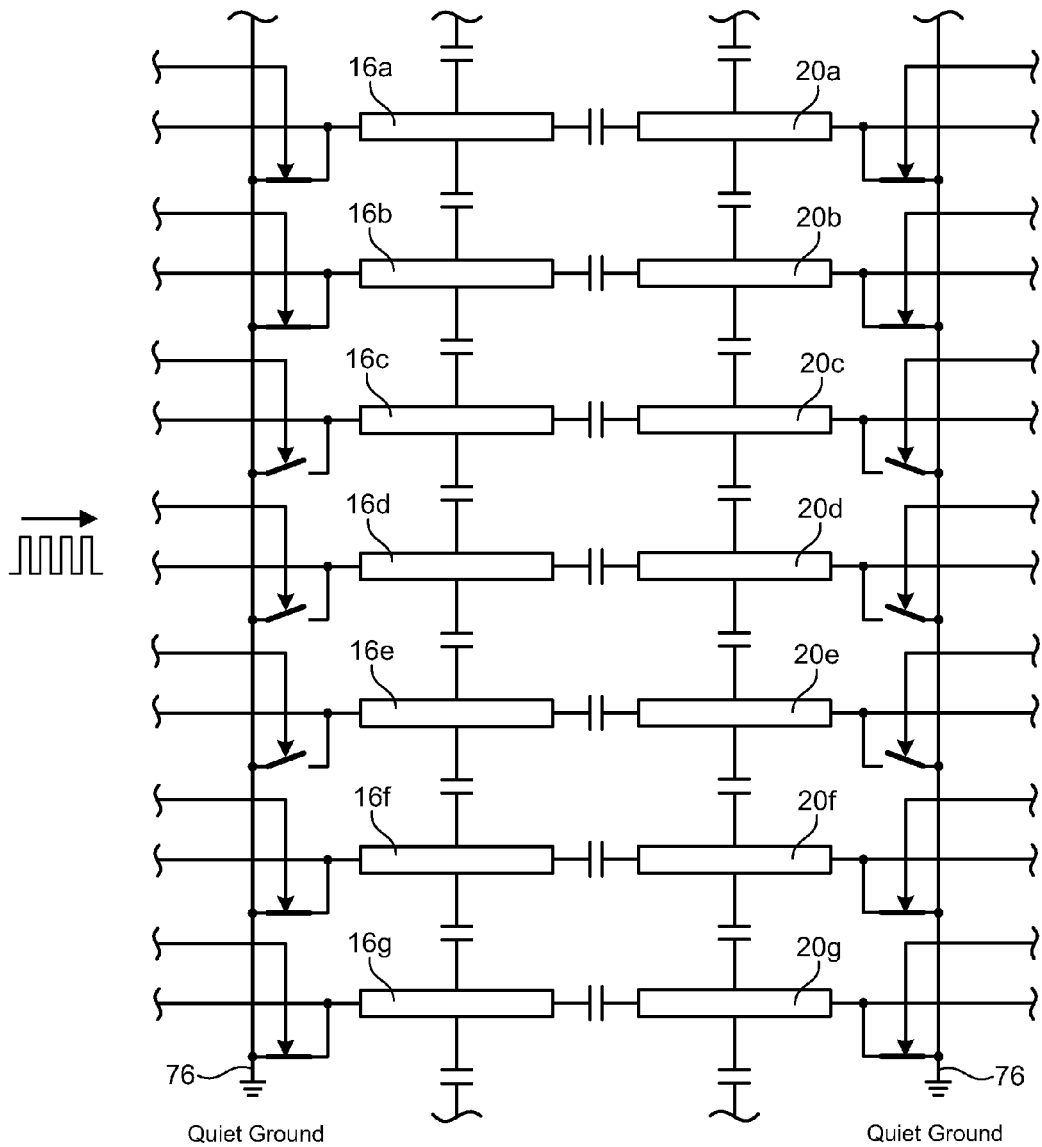
FIG. 7 is a high-level block diagram showing an embodiment of an apparatus to connect and disconnect both transmitting and receiving elements to and from a quiet ground in accordance with the invention.

Referring to FIGS. 6 and 7, as mentioned previously, the apparatus and methods disclosed herein are not limited to the illustrated fingerprint sensor. Indeed, the apparatus and methods disclosed herein may be used with fingerprint sensors using a small number of transmitting elements and a relatively large number of receiving elements, a large number of transmitting elements and a relatively small number of receiving element, or a roughly equal number of transmitting elements and receiving elements.

For example, FIG. 6 shows one embodiment of a fingerprint sensor using a single transmitting element 16 and multiple receiving elements 20a-g. As shown, an isolated quiet ground 76, separate from other grounds, may be used to ground receiving elements 20a, 20b, 20f, 20g that are inactive (not currently being used for sensing purposes). This may help to ensure that receiving elements 20 that are inactive do not parasitically capacitively couple signals, received from the transmitting element 16 or from a noisy ground, to the active receiving element 20d.

FIG. 7 shows one embodiment of a fingerprint sensor using multiple transmitting elements 16a-g and multiple receiving elements 20a-g. In this embodiment, a quiet ground 76, separate from other grounds, is used to ground transmitting elements 16a, 16b, 16f, 16g and receiving elements 20a, 20b, 20f, 20g that are inactive and not currently used for sensing purposes. This may ensure that transmitting elements 16 and receiving elements 20 that are inactive do not parasitically capacitively couple signals received from a noisy ground to the active transmitting and receiving elements 16d, 20d.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A fingerprint sensing circuit for reducing parasitic capacitive coupling and noise when scanning a fingerprint, the fingerprint sensing circuit comprising:
   a plurality of transmitting elements configured to sequentially transmit a probing signal;
   a digital ground to provide a ground for digital components in the fingerprint sensing circuit;
   a quiet ground, different from the digital ground;
   a grounding switch electrically connected between the quiet ground and a respective transmitting element; and
   control logic configured to selectively connect each transmitting element to the quiet ground through the operation of the respective grounding switch.

2. The fingerprint sensing circuit of claim 1, further comprising a plurality of switches configured to selectively connect each transmitting element to the quiet ground and disconnect each transmitting element from the quiet ground.

3. The fingerprint sensing circuit of claim 2, wherein the control logic controls the operation of the switches.

4. The fingerprint sensing circuit of claim 1, wherein the plurality of transmitting elements are arranged in a substantially linear array.

5. The fingerprint sensing circuit of claim 4, wherein the control logic is further configured to connect transmitting elements that are adjacent to a transmitting element transmitting the probing signal, to the digital ground.

6. The fingerprint sensing circuit of claim 1, wherein the digital ground and quiet ground are connected to one another at a ground plane.

7. The fingerprint sensing circuit of claim 1, further comprising a receiving element configured to sense the probing signal from the plurality of transmitting elements.

8. A method for reducing parasitic capacitive coupling and noise in a fingerprint sensing circuit, the method comprising:
   providing a plurality of transmitting elements to sequentially transmit a probing signal;
   providing a digital ground to ground digital components in the fingerprint sensing circuit;
   providing a quiet ground, different from the digital ground;
   providing a grounding switch electrically connected between the quiet ground and a respective transmitting element;
   selectively connecting, to the quiet ground, each transmitting element through the operation of the respective grounding switch; and
   disconnecting, from the quiet ground, transmitting elements that are transmitting the probing signal.

9. The method of claim 8, further comprising providing a plurality of switches to selectively connect and disconnect each transmitting element from the quiet ground.

10. The method of claim 9, further comprising providing control logic to control the operation of the switches.

11. The method of claim 8, further comprising arranging the plurality of transmitting elements in a substantially linear array.

12. The method of claim 11, further comprising providing control logic to connect transmitting elements that are adjacent to a transmitting element emitting the probing signal, to the digital ground.

13. The method of claim 8, further comprising connecting the digital ground and quiet ground to one another at a ground plane.

14. The method of claim 8, further comprising providing a receiving element to sense the probing signal emitted by the plurality of transmitting elements.

15. A fingerprint sensing circuit for reducing parasitic capacitive coupling and noise when scanning a fingerprint, the fingerprint sensing circuit comprising:
   a plurality of receiving elements configured to sequentially sense a probing signal;
   a digital ground configured to provide a ground for digital components in the fingerprint sensing circuit;
   a quiet ground, substantially separate from the digital ground, configured to provide a ground for selected receiving elements that are not currently sensing the probing signal;
   a grounding switch electrically connected between the quiet ground and a respective receiving element; and
   control logic configured to selectively disconnect a receiving element that is currently sensing the probing signal from the quiet ground, while selectively connecting receiving elements that are not sensing the probing signal to the quiet ground.

16. The fingerprint sensing circuit of claim 15, further comprising a plurality of switches to selectively connect and disconnect each receiving element from the quiet ground.

17. The fingerprint sensing circuit of claim 16, wherein the control logic controls the operation of the switches.

18. The fingerprint sensing circuit of claim 15, wherein the plurality of receiving elements are arranged in a substantially linear array.

19. The fingerprint sensing circuit of claim 18, wherein the control logic is further configured to connect, to the digital ground, receiving elements that are adjacent to a receiving element sensing the probing signal.

20. The fingerprint sensing circuit of claim 15, wherein the digital ground and quiet ground are connected to one another at a ground plane.

* * * * *